(12) United States Patent
Schnoebelen, Jr.

(10) Patent No.: US 8,507,066 B2
(45) Date of Patent: Aug. 13, 2013

(54) PAINT MASKING FOR CORNERS

(75) Inventor: John E. Schnoebelen, Jr., Springfield, MO (US)

(73) Assignee: Shurtech Brands, LLC, Hickory, NC (US)

( * ) Notice: Subject to any disclaimer, the term of this patent is extended or adjusted under 35 U.S.C. 154(b) by 625 days.

(21) Appl. No.: 12/362,521

(22) Filed: Jan. 30, 2009

(65) Prior Publication Data

US 2009/0133621 A1 May 28, 2009

Related U.S. Application Data

(63) Continuation of application No. 10/401,169, filed on Mar. 27, 2003, now abandoned, which is a continuation of application No. 09/930,419, filed on Aug. 16, 2001, now Pat. No. 6,579,587.

(51) Int. Cl.
*B32B 3/06* (2006.01)

(52) U.S. Cl.
USPC .............. 428/42.3; 428/80; 428/194

(58) Field of Classification Search
USPC ............... 428/40.1, 41.8, 42.3, 80, 194, 906; 118/504, 505
See application file for complete search history.

(56) References Cited

U.S. PATENT DOCUMENTS

| | | |
|---|---|---|
| 2,045,597 A | 6/1936 | Haug |
| 2,517,220 A | 8/1950 | Lister |
| 2,672,122 A | 3/1954 | Kupec et al. |
| 2,816,655 A | 12/1957 | Crozier et al. |
| 2,996,041 A | 8/1961 | Carpenter et al. |
| 3,752,304 A | 8/1973 | Alef |
| 4,313,970 A | 2/1982 | Jones |
| 4,397,261 A | 8/1983 | Jones |
| 4,420,520 A | 12/1983 | Jones et al. |
| 4,590,109 A | 5/1986 | Holmberg |
| 4,696,706 A * | 9/1987 | Griffin et al. .......... 156/62 |
| 4,789,579 A | 12/1988 | Tutas |
| 5,056,191 A | 10/1991 | Love |
| 5,441,769 A | 8/1995 | Ross |
| 5,468,538 A | 11/1995 | Nameche |
| 5,494,518 A | 2/1996 | Keane et al. |
| 5,494,519 A | 2/1996 | Jeffrey, Jr. |

(Continued)

FOREIGN PATENT DOCUMENTS

DE 9418 708 U1 7/1995
EP 0276 557 A 8/1988

OTHER PUBLICATIONS

Supplementary European Search Report—Mar. 16, 2006.
International Preliminary Examination Report Jul. 3, 2003.

(Continued)

*Primary Examiner* — Alexander Thomas
(74) *Attorney, Agent, or Firm* — Fay Sharpe LLP

(57) ABSTRACT

A paint mask particularly adapted for masking corner areas of a demarcation zone to facilitate painting of an area of a workpiece disposed on the other side of the demarcation zone is formed of a thin, flexible sheet having opposite faces. The paint mask includes a first leg and a second leg that are generally rectangular in shape, and the legs intersect to form a right angle adapted for masking a corner and adjacent area. The bottom side of the paint mask which contacts the surface to be masked includes an adhesive for adhering the mask to the workpiece. The top side has release means for releasing stacked paint masks from each other.

12 Claims, 2 Drawing Sheets

(56) References Cited

U.S. PATENT DOCUMENTS

| | | |
|---|---|---|
| 5,623,740 A | 4/1997 | Burns |
| 5,631,055 A | 5/1997 | Vines et al. |
| 5,722,120 A | 3/1998 | Bindschatel et al. |
| 5,800,894 A | 9/1998 | Navis |
| 5,916,653 A | 6/1999 | Kunstadter et al. |
| 5,962,072 A | 10/1999 | Yerman |
| 6,001,301 A | 12/1999 | Kinoshita et al. |
| 6,017,079 A | 1/2000 | Warner |
| 6,040,026 A | 3/2000 | Iwabuchi et al. |
| 6,248,414 B1 | 6/2001 | Donahue |
| 6,315,831 B1 | 11/2001 | Renetta |
| 6,579,587 B2 | 6/2003 | Schnoebelen, Jr. |
| 6,852,408 B2 | 2/2005 | Hansen et al. |
| 2002/0004133 A1 | 1/2002 | Nakib |
| 2003/0170452 A1 | 9/2003 | Hansen et al. |

OTHER PUBLICATIONS

U.S. Appl. No. 60/184,370, filed Feb. 23, 2000.
Decision on Appeal dated Aug. 5, 2009.

\* cited by examiner

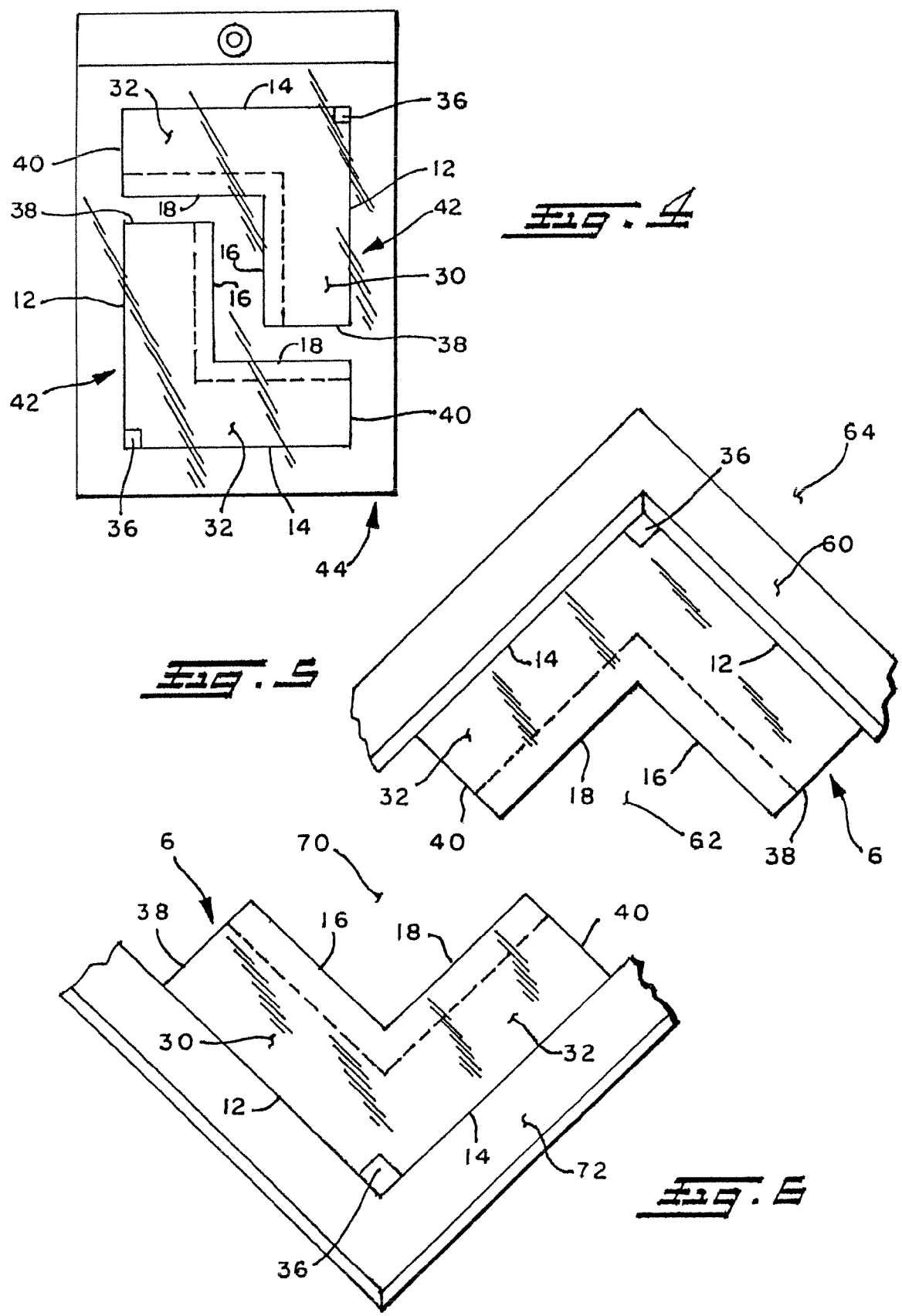

PAINT MASKING FOR CORNERS

The present application is a continuation of U.S. application Ser. No. 10/401,169 filed Mar. 27, 2003, now abandoned, which in turn claims priority to U.S. application Ser. No. 09/930,419 filed on Aug. 16, 2001, now U.S. Pat. No. 6,579,587.

The present invention relates to masking products for use by painters, and more specifically, to a corner masking product to mask the corner of a window or other surface to be protected during painting.

While the present invention finds particular utility in connection with a masking product for use by painters and, accordingly, will be described in detail herein in connection with such use, those skilled in the art will recognize that the invention may have other applications and could be utilized, for example, for arts and crafts and other paint and design related purposes.

BACKGROUND OF THE INVENTION

Masking products and other covers are widely used in modern day painting. In many instances, painting is conducted in conjunction with the use of masking products, paint masks, and other paint covers which facilitate protecting surfaces and areas from unwanted paint during the painting operation. The following patents are incorporated herein by reference as background information with regard to such masking products: U.S. Pat. No. 5,468,538 to Nameche; and, U.S. Pat. No. 5,441,769 to Ross.

Wood, non-wood, metal and plastic materials are used to construct framed windows typically found in homes and other buildings to provide a mechanism which allows light and air to be received into the interior space of the buildings. In addition, windows provide an ornamental value to structures. In particular, windows are used to improve the aesthetic appearance of the interior and exterior walls of buildings. Although the number of different window arrangements is infinite, the majority of window configurations are rectilinear structures.

Many common types of windows in use involve the use of a window frame with a number of individual panes of glass. The glass typically is separated by dividers commonly referred to as mullions. The mullion is a slender member which divides the panes of glass and provides structural support to the panes of glass in conjunction with the window frame. The panes of glass are positioned in association with the mullions and window frame by glass pointers. In addition, window glazing or putty compound is used along the perimeter of the window pane to further support the glass in the frame and also to prevent air and moisture from passing around the circumference of the window pane.

Periodically, the window frames and associated mullions need repainting. Also, windows are painted to change the color and decor of interior and exterior surfaces of a room and/or building. Painting window frames and mullions requires the painter to very carefully apply paint to the frames and mullions while at the same time attempting to prevent the window panes from receiving paint. Typical solutions attempt to shield the window panes from the painter's brush and accompanying paint. These shields may take on the form of masking tape, which is cumbersome to apply in corners. Another approach is to not shield the window panes and allow the paint to inadvertently be applied to the window panes. This approach requires the painter to remove the unwanted paint with a razor blade. The resulting additional step of scraping adds time, effort, and clean up to an already laborious activity.

One example of a paint masking kit for windows is shown in the aforementioned patent to Nameche and, generally, comprises a container having a plurality of reusable window balance covers having predetermined sizes and shapes for covering a header and balance portions of a window and a predetermined amount of a plastic sheet material for covering the glass portions of the window. The plastic sheet material for covering the glass portion is a transparent, vinylic sheet material provided in a roll or sheet form to be cut to fit any size and shape window glass. The plastic sheet material includes an adhesive on one side for removably attaching the material to the window glass before painting. This paint masking kit requires the user to measure the window dimensions, cut the sheet material, and install the cut sheet over the entire window glass area. The user must carefully cut straight edges and right angle corners without any margin for error. The adhesive on the entire bottom side makes handling and positioning difficult. Here, the effectiveness of the paint mask is dependent upon the time expended, accuracy, and skill of the user. This method is time consuming, cumbersome, and wasteful. Also, the paint mask does not conform or adjust to window applications with non-uniform or missing window glazing around the perimeter of the window pane.

Another example of a paint masking kit for windows is shown in the aforementioned patent to Ross and, generally, comprises predetermined sized plastic sheets for covering an entire pane of glass secured to mullions of a window. The flexible material has an attractiveness for holding to glass. The sheet is sized for covering an entire pane of glass and is designed to seal against the window to resist dislodgement and to receive the overlapping paint while the mullion is painted. Ross's window masks are limited due to their predetermined sizes for applications with standard window sizes. In applications where the windows are of non-standard size, the window masks are not effective. In addition, the overlapping paint which adheres to the paint mask will remain on the paint mask and diminish the effectiveness of this masking technique with each subsequent application. Any clean-up of these reusable paint masks adds additional time and effort. Similarly, as described above, a paint mask of this type does not conform or adjust to window applications with non-uniform or missing window glazing around the perimeter of the window pane.

Painting of floors, walls, and ceilings also involves painting of corners and demarcating an area to be painted from an area not to be painted. The aforementioned situations arise, for example, when painting baseboard molding, walls, and crown molding. In these situations, the molding, which is to be painted, must be demarcated from the floor and/or walls, which are to be protected. Demarcating the area not to be painted is critical in situations such as when painting the baseboard molding which typically runs adjacent the floor surface. Inadvertently painting the floor surface causes an additional problem due to the fact that paint cannot easily be removed from the floor surface. The references cited above are ineffective for such paint operations not involving windows.

SUMMARY OF THE INVENTION

The present invention provides an improvement for paint masking of the type described which overcomes the above referred-to difficulties and others, and is easy to use. More particularly in this respect, a paint mask is provided which is particularly adapted for masking corner areas of a demarcation zone to facilitate painting of an area of a workpiece which is disposed on the other side of the demarcation zone. The paint mask is comprised of a thin, flexible sheet material (i.e. masking tape, paper, etc.) having top and bottom faces and, preferably, first and second legs that intersect to form a right angle. The paint mask sheet includes an adhesive on the bottom face which is adapted to engage and hold the mask sheet in the demarcation zone. The adhesive is pressure sensitive which allows for easy installation and removal from the surface without leaving any of the pressure-sensitive adhesive on the demarcation zone. Preferably, the paint mask sheet includes a non-adhesive area on the bottom face which allows the user to easily grasp, install, and remove the paint mask sheet from the window surface, floor surface, ceiling surface, etc. The paint mask includes flexible material which can be manipulated and oriented on the demarcation zone which allows adjusting of the mask to accommodate for variability in the edges and corners. Additionally, the handling and positioning of the paint mask can be accomplished with one hand by applying pressure to the top face once the paint mask has been positioned. The user's grip is subsequently removed from the non-adhesive top and bottom faces without disturbing the position of the paint mask. Subsequent to painting, the paint mask is pulled from, for example, the window pane and disposed of without any additional clean up.

It is preferred to provide the top faces of the paint mask sheets with a release coating or paper so that a plurality of the paint mask sheets are stackable upon each other to form a pad, which is easy to store, carry, and handle, and from which individual paint mask sheets can readily be removed for application to the demarcation zone. Further, a pair of paint mask pads can be nestled so as to allow the pads to be efficiently packaged, displayed, and sold.

Advantageously, the use of the paint mask during a painting operation allows the user to efficiently and effectively mask the corner of a window, floor, ceiling, wall, etc. to prevent paint from inadvertently being applied to the protected surface. The paint mask enables the user to mask the corner without utilizing other tools (i.e. knife or scissors), which increases the efficiency of the painting operation and results in higher quality, and enables the masking operation to be completed more quickly and efficiently than heretofore possible. In this respect, for example, once the paint masks are applied to the corners of a window pane, the user needs simply to apply straight pieces of masking tape therebetween to complete the masking operation.

It is accordingly an outstanding object of the present invention to provide an improved paint mask which is economical to produce and use and which enables a user to complete a masking operation more efficiently and more economically than heretofore possible.

Another object is the provision of a paint mask of the foregoing character that has an adhesive face which easily adheres to a window, floor, ceiling, wall, etc. to removably secure the paint mask in place.

Still another object of the present invention is to provide a paint mask of the foregoing character including a non-adhesive zone for assisting the user in handling, installing, and removing the paint mask sheet.

Yet another object of the invention is the provision of a paint mask which includes an adhesive zone that quickly and cleanly disengages from the window, floor, ceiling, wall, etc.

A further object of the invention is the provision of a corner paint mask which is simple in construction, economical to manufacture and package, and easy to install and use.

Still a further object is the provision of a paint mask of the foregoing character which includes a pressure-sensitive adhesive which can be cleanly and easily manually removed from the surface portion without leaving any of the layer of pressure-sensitive adhesive on a surface portion.

Yet a further object is the provision of a paint mask of the foregoing character which allows the user to install the paint mask with a single hand.

Another object is the provision of a paint mask of the foregoing character which adheres flatly to the glass pane with the edges of the paint mask sheet abutted against the putty, caulk, or wood trim holding the glass pane to the mullion, and which allows for a certain degree of adjustment to account for irregular edges along a window pane.

A further object is the provision of a paint mask of the foregoing character which adheres flatly to a floor, ceiling, and/or wall with the edges of the paint mask sheet abutted against the edge of a baseboard molding, crown molding, etc., and which allows for a certain degree of adjustment to account for irregular edges along the line of demarcation.

BRIEF DESCRIPTION OF THE DRAWINGS

The invention may take physical form in certain parts and arrangements of parts, preferred embodiments of which will be described in detail in the specification, and are illustrated in the accompanying drawings, which form a part hereof and wherein:

FIG. 4 is a top view of a paint mask package;

FIG. 5 is a perspective view showing an alternative paint mask installation in accordance with the present invention; and, FIG. 6 is a plan view showing another alternative paint mask installation in accordance with the present invention.

DESCRIPTION OF PREFERRED
EMBODIMENTS OF THE INVENTION

Figure 1:
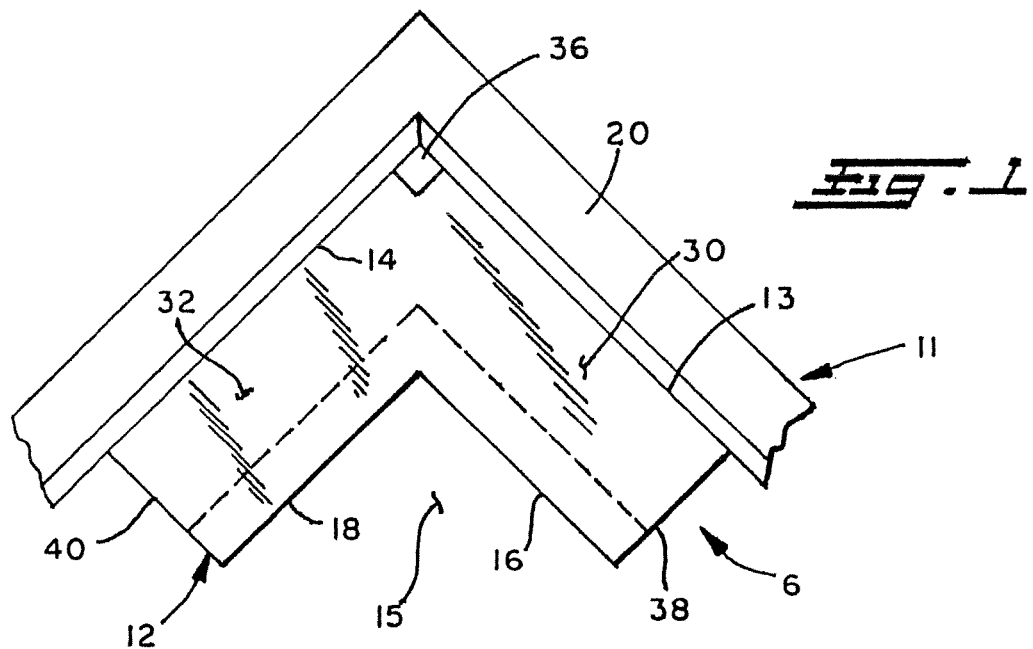
FIG. 1 is a perspective view of a paint mask in accordance with the present invention installed in the corner of a window pane.

Referring now in greater detail to the drawings, wherein the showings are for the purpose of illustrating preferred embodiments of the invention only, and not for the purpose of limiting the invention, FIG. 1 illustrates a paint mask 6, in accordance with the present invention secured to window pane 15, as will be described more fully herein. Paint mask 6, as shown in FIG. 1, is L-shaped and comprised of a first leg 11 and a second leg 12. First leg 11 includes an outer edge 13, an inner edge 16 and a terminal edge 38, and second leg 12 includes an outer edge 14, an inner edge 18 and a terminal edge 40. Legs 11 and 12 intersect for edges 13 and 14 to form a right angle 36. As shown in FIG. 1, the demarcation zone on pane 15 is generally identified along the perimeter of paint mask 6 as defined by edges 13, 14, 40, 18, 16, and 38 of legs 11 and 12. Paint mask 6 protects the corners of window pane 15 from inadvertently being painted as paint is applied to window frame 20 along edges 13 and 14 of mask 6. In use, it will be appreciated that masking tape would be applied to window pane 15 along window frame 20 from edges 38 and 40 of mask 6 to a similar mask in each of the corners of frame 20.

Figure 2:
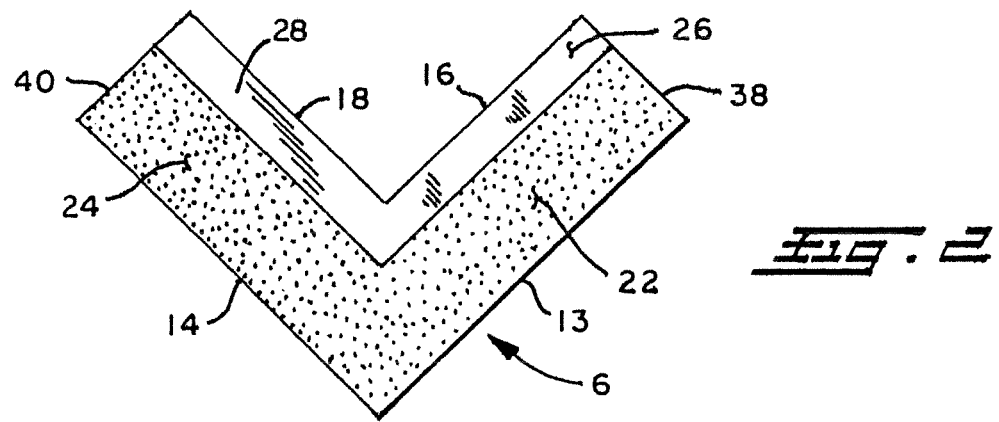
FIG. 2 is a bottom plan view of the paint mask of FIG. 1.

Paint mask 6, as shown in FIG. 1, includes a non-adhesive top face 30 on first leg 11 and a non-adhesive top face 32 on second leg 12. As shown in FIG. 2, the bottom face of paint mask 6 includes an adhesive zone 22 on first leg 11 and an adhesive zone 24 on second leg 12. The two adhesive zones 22 and 24 are defined by a suitable pressure sensitive adhesive and engage the surface to be protected along the edges of frame 20 corresponding to edges 13 and 14 of mask 6. The bottom face of paint mask 6 also includes a non-adhesive zone 26 on first leg 11 and a non-adhesive zone 28 on second leg 12. Non-adhesive zones 26 and 28 do not adhere to the surface to be protected and allow the user to easily grasp, install, and remove paint mask 6 from the work surface. In this respect, the user holds paint mask 6 with one hand by placing his/her thumb on one side of paint mask 6 and his/her fingers on the opposing side. The thumb and fingers do not come into contact with adhesive zones 22 and 24, whereby the user can easily position and install paint mask into its desired orientation. Once in position, the user can release his/her grip from paint mask 6 without disturbing the positioning, because the finger(s) are not adhered to the adhesive portions of paint mask 6. After the painting operation is completed, the user can easily remove paint mask 6 by grasping non-adhesive zones 26 or 28 and the respective opposing non-adhesive top face 30 or 32 and pulling paint mask 6 from pane 15.

Figure 3:
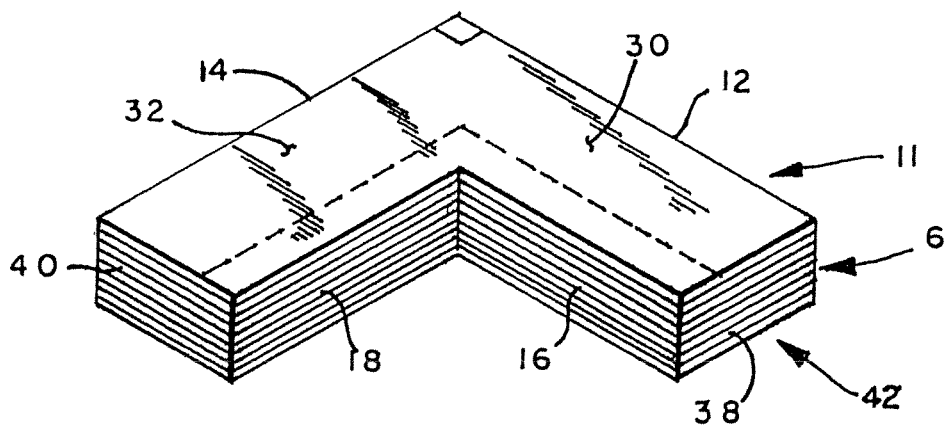
FIG. 3 is a perspective view of a paint mask pad formed in accordance with the present invention.

As will be appreciated from FIG. 3 of the drawings, and the foregoing description, a plurality of paint masks 6 can be releasably stacked one on top of another to form a pad 42 of stacked paint masks. Adhesive zones 22 and 24 of first leg 11 and second leg 12, respectively, engage the preceding underlying paint mask 6 on its non-adhesive faces 30 and 32, respectively. Depending on the material of the substrate and the pressure sensitive adhesive, faces 30 and 32 may be provided with a release coating to facilitate peeling the adjacent masks apart. The formation of a paint mask pad allows the user to easily store, carry, handle, and separate individual paint mask sheets. Non-adhesive zones 26 and 28 of first leg 11 and second leg 12, respectively, allow the user to easily remove an individual paint mask 6 from paint mask pad 42 and apply paint mask 6 to the demarcation zone. It will be appreciated that the user can grasp and remove each paint mask 6 from paint mask pad 42 and install paint mask 6 upon the demarcation zone with one hand.

In a preferred method of packaging, paint mask pads 42 are oriented and nestled to form a single package 44 which comprises two paint mask pads 42. The nestling of paint mask pads 42 in package 44 allows paint masks 6 to be efficiently packaged, displayed, and sold. More particularly in this respect, as shown in FIG. 4 of the drawings, two paint mask pads 42 are rotated 180° relative to each other and are nestled together to form a paint mask package 44 of two paint mask pads. It will be appreciated that the packaging of the two paint mask pads 42 in the aforementioned manner provides an economical and effective means for packaging and displaying the paint mask sheets.

As will be appreciated from FIG. 5 of the drawings, and the foregoing description, paint mask 6 can be utilized in a number of different applications. Specifically, FIG. 5 shows paint mask 6 being utilized to protect floor 62 as the user paints the corner between baseboards 60, which are affixed to walls 64. In this embodiment, the demarcation zone is generally defined as the area between floor 62 and baseboard moldings 60. Similarly, FIG. 6 displays paint mask 6 in yet another application. Specifically, paint mask 6 is utilized to protect ceiling 70 as the user paints, for example, the corner between crown moldings 72 which are affixed to walls 64. As such, the demarcation zone is generally defined as the line between ceiling 70 and crown molding 72. As mentioned above, it will be appreciated that straight sections of masking tape will be applied to extend from the ends of masks 6 in the embodiments of FIGS. 5 and 6.

While considerable emphasis has been placed herein on the structures and configuration of the preferred embodiments of the invention, it will be appreciated that other embodiments, as well as modifications of the embodiments disclosed herein, can be made without departing from the principles of the invention. In this respect, it will be appreciated that the paint mask can be used in other kinds of applications. Likewise, it will be appreciated that a paint mask according to the invention can be secured to the work surface in any number of different ways. These and other modifications of the preferred embodiments, as well as other embodiments of the invention (e.g. the packaging of the paint mask could be in the form of a roll or sheet), will be obvious and suggested to those skilled in the art from the disclosure herein, whereby it is to be distinctly understood that the foregoing descriptive matter is to be interpreted merely as illustrative of the present invention and not as a limitation thereof.

Having thus described the invention, it is claimed:

1. A paint mask package for masking corner areas of a window adjacent work pieces to be painted, comprising:
    said paint mask package including a plurality of paint mask sheets, wherein each of said plurality of paint mask sheets comprises:
        opposite bottom and top faces and at least a first and a second outer edge, said at least first and second outer edges intersecting at an angle of 90°;
        said sheets include an inner edge;
        said sheet includes a non-adhesive area on said bottom face along said inner edge;
        said sheet includes an adhesive on said bottom face wherein said adhesive includes an area extending completely from said first and second outer edges toward said non-adhesive area;
        said non-adhesive area extends completely from said inner edge towards said adhesive area wherein said sheet includes a single line of demarcation between said adhesive area and said non-adhesive area;
        said non-adhesive area includes at least two non-adhesive outside corners;
    said plurality of paint mask sheets comprising a stack of paint mask sheets wherein individual paint mask sheets having said non-adhesive area along said inner edge being releasably oriented one directly on top of another to form a pad;
    a first said pad and a second said pad nestled together to provide said paint mask package; and,
    said pad presents each uppermost said sheet for grasping and wherein said non-adhesive outside corners facilitate said grasping between a thumb and fingers by said non-adhesive area on said bottom face and said top face for removing from said package.

2. The paint mask package according to claim 1, wherein said adhesive area is greater than said non-adhesive area.

3. A paint mask package for masking corner areas of a window adjacent work pieces to be painted, comprising:
    said paint mask package including a plurality of paint mask sheets, wherein each of said plurality of paint mask sheets comprises:
        opposite bottom and top faces and a first and a second outer edge, said first and second outer edges intersecting at an angle of 90°;
        said sheets include an inner edge;

said sheets include an adhesive area on said bottom face in a band continuously along said first and second outer edges;

said sheets include a non-adhesive area on said bottom face, wherein said non-adhesive area extends completely from said inner edge to said adhesive area;

said non-adhesive area includes a non-adhesive outside corner;

said adhesive extends continuously from said first and second outer edges toward said inner edge;

said plurality of paint mask sheets being releasably stacked one directly on top of another to form a pad of stacked said plurality of paint mask sheets;

a first said pad and a second said pad oriented relative to each other to form a substantially rectilinear said paint mask package; and, said package presents said non-adhesive area including said non-adhesive outside corner of an uppermost said sheet for grasping between a thumb and fingers of one hand by said non-adhesive area on said bottom face and said top face for removing from said pad.

4. The paint mask package according to claim 3, wherein said adhesive area is greater than said non-adhesive area.

5. A paint mask package for masking corner areas of a window adjacent work pieces to be painted, comprising:

said paint mask package including a plurality of paint mask sheets, wherein each of said plurality of paint mask sheets comprises:

opposite bottom and top faces and a first and a second outer edge, said first and second outer edges intersecting at an angle of 90°;

said sheets include an inner edge;

said sheets include an adhesive on said bottom face including an area extending completely along said first and second outer edges, wherein said adhesive area extends from said first and second outer edges toward said inner edge;

said sheets include a non-adhesive area on said bottom face, wherein said non-adhesive area extends completely from said adhesive to said inner edge;

said non-adhesive area includes two non-adhesive outside corners;

said sheet being rectilinear in shape;

each of said plurality of paint mask sheets being releasably oriented one directly on top of another to form a pad and a first said pad and a second said pad together provide said paint mask package; and, said package presents said non-adhesive area including said two non-adhesive outside corners of an uppermost said sheet of each said pad from said uppermost to a lowermost in a stack for one-handed grasping, wherein said one-handed grasping consists of a thumb and fingers, of said uppermost said sheet by said non-adhesive area on said bottom face and said top face, separating from an underlying said sheet and, removing from said package.

6. A paint mask package for masking corner areas of a window, comprising:

said paint mask package including a plurality of paint mask sheets, wherein each of said plurality of paint mask sheets comprises:

opposite bottom and top faces and a first and a second outer edge, said first and second outer edges intersecting at an angle of 90°;

said sheet includes an inner edge;

said sheet includes a continuous adhesive area on said bottom face extending from said first and second outer edges toward said inner edge;

said sheet includes a continuous non-adhesive area on said bottom face, wherein said non-adhesive area extends completely from said adhesive area to said inner edge;

said non-adhesive area includes a pair of opposing non-adhesive outside corners;

said adhesive area is greater than said non-adhesive area;

said sheet being rectilinear in shape;

said top face of each sheet includes release coating and said adhesive on said bottom face of each paint mask sheet releasably engages said release coating of said top face of the adjacent underlying paint mask sheet;

said plurality of print mask sheets being releasably oriented one directly on top of another to form a pad and wherein a first said pad and a second said pad together provide an unfolded package; and, said unfolded package presents said non-adhesive area including said opposing non-adhesive outside corners of each uppermost said sheet for grasping, wherein said grasping consists of a thumb and fingers of one hand, by said non-adhesive area on said bottom face and said top face, separating from an underlying said sheet, and removing from said package.

7. A paint mask package for masking corner areas of a window, comprising:

said paint mask package including a plurality of paint mask sheets, wherein each of said plurality of paint mask sheets comprises:

opposite bottom and top faces and a first and a second outer edge, said first and second outer edges intersecting at an angle of 90°;

said sheets include an inner edge;

said sheets include a continuous adhesive area on said bottom face extending from said first and second outer edges toward said inner edge;

said sheets include a continuous non-adhesive area on said bottom face, wherein said non-adhesive area extends completely from said adhesive area to said inner edge, and wherein said non-adhesive area comprises at least one corner and said inner edge;

said non-adhesive area includes a pair of non-adhesive outside corners;

said sheets being rectilinear in shape;

said top face of each sheet includes release coating and said adhesive on said bottom face of each paint mask sheet releasably engages said release coating of said top face of the adjacent underlying paint mask sheet;

said plurality of paint mask sheets being overlayed and stacked one on top of another to form a pad of stacked said sheets; and, said pad of stacked said sheets presents each uppermost said sheet for grasping with one hand by said non-adhesive area on said bottom face and said top face, separating from the underlying said sheet and removing from said pad, wherein said grasping with said one hand consists of a thumb and fingers.

8. A paint mask package for masking corner areas of a window adjacent work pieces to be painted, comprising:

said paint mask package including a plurality of paint mask sheets, wherein each of said plurality of paint mask sheets comprises:

opposite bottom and top faces and at least a first and a second outer edge, said at least first and second outer edges intersecting at an angle of 90°;

said sheets include an inner edge;

said sheets include an adhesive on said bottom face;

said sheet includes a non-adhesive area on said bottom face, wherein said non-adhesive area extends completely from said adhesive to said inner edge;

said non-adhesive area includes at least one non-adhesive outside corner;

said sheets include flexible material for adjusting said first and said second outer edges along the work pieces to be painted;

said plurality of paint mask sheets includes at least four paint mask sheets wherein at least one said paint mask sheet being releasably overlayed upon another said paint mask sheet to form a pad; and, said package presents individual said paint mask sheets from said pad consecutively for grasping said non-adhesive area with a thumb and fingers each of said plurality of paint mask sheets for removing from said package.

9. The paint mask package according to claim 8, wherein said sheets being rectilinear in shape.

10. The paint mask package according to claim 8, wherein said package is a combination of adjacent said pads.

11. A paint mask package for masking corner areas of a window adjacent work pieces to be painted, comprising:

said paint mask package including a plurality of paint mask sheets, wherein each of said plurality of paint mask sheets comprises:

opposite bottom and top faces and a first and a second outer edge, said first and second outer edges intersecting at an angle of 90°;

said sheets include an inner edge;

said sheets include an adhesive on a majority of said bottom face;

said adhesive is pressure sensitive for aiding installation and removal;

said adhesive extends from said first and second outer edges toward said inner edge;

said sheets include a non-adhesive area on said bottom face having at least one non-adhesive outside corner;

said plurality of paint mask sheets being oriented relative to each other and stacked one upon another to form a paint mask pad, wherein a first said pad and a second said pad nestled together to form a paint mask package of said sheets;

said plurality of paint mask sheets includes individual said paint mask sheets being releasably oriented and overlayed upon another individual said paint mask sheet; and, said package presents individual said paint mask sheets consecutively for grasping said non-adhesive area with a thumb and fingers each of said plurality of paint mask sheets for removing from said package.

12. The paint mask package according to claim 11, wherein said sheets being L-shaped.

\* \* \* \* \*